United States Patent Office 3,483,393
Patented Dec. 9, 1969

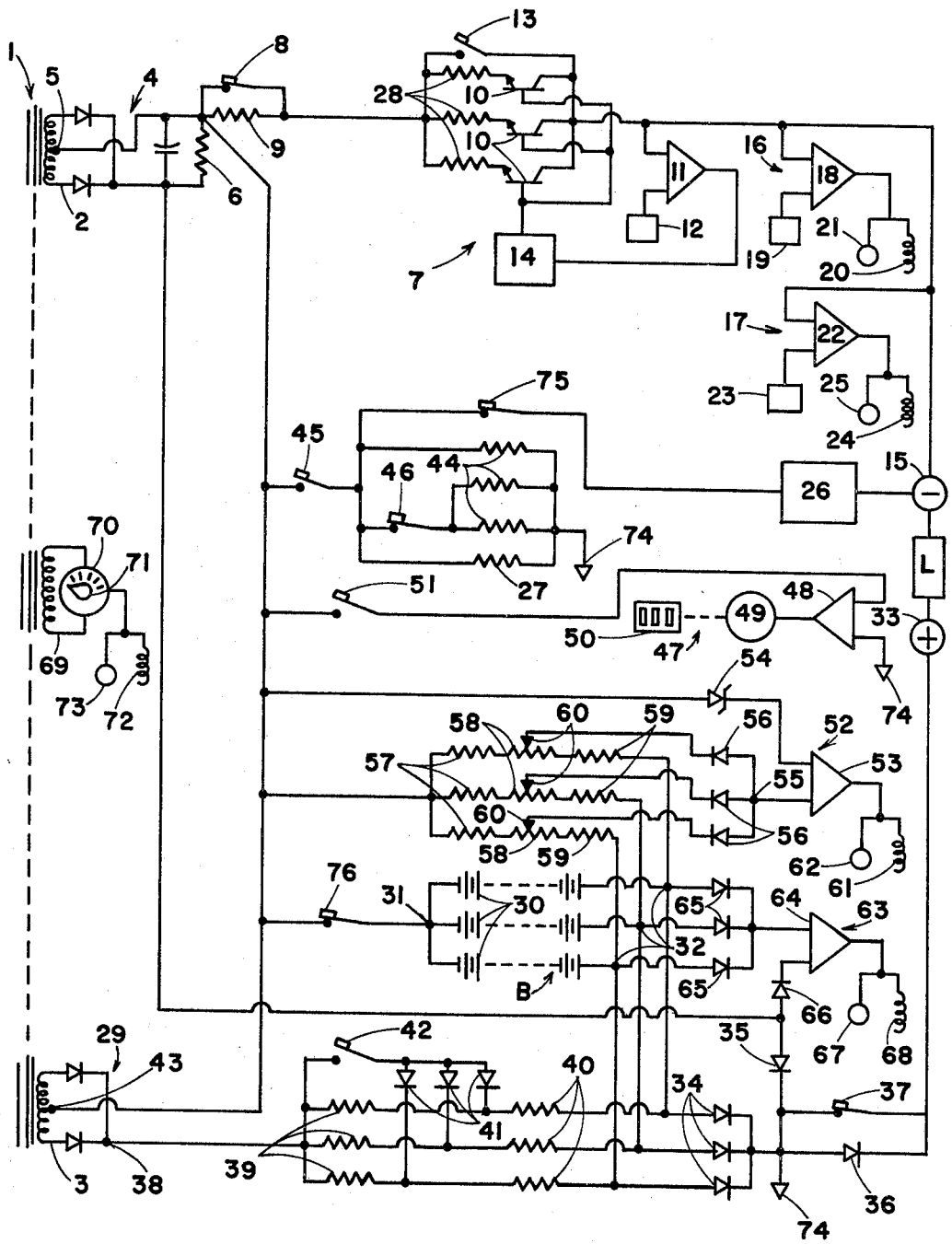

3,483,393
POWER SUPPLY SYSTEM FOR PROCESS
CONTROL INSTRUMENTATION
Alfred N. Gutzmer, Webster, and David A. Willett, Penfield, N.Y., assignors to Sybron Corporation, a corporation of New York
Filed Sept. 1, 1966, Ser. No. 576,629
Int. Cl. H02j 7/00, 9/00
U.S. Cl. 307—66                                      8 Claims

ABSTRACT OF THE DISCLOSURE

A power supply system for process control instrumentation includes a regulator providing regulated D.C. from an A.C. source and has an emergency battery supply operative upon failure of the A.C. source. The system is designed to be substantially proof against regulator failures and provides for monitoring and maintaining the condition of the battery supply.

This invention relates to electrical power supply systems for industrial process control instrumentation, including measuring devices, controllers, signals, alarms and other entities commonly used in the control of industrial processes, and requiring electrical energization. Instrumentation of this sort is disclosed and claimed in such U.S. Letters Patent as Decker et al. No. 3,069,554 of Dec. 18, 1962, Muller-Girard No. 3,173,003 of Mar. 9, 1965 and Kordes et al. No. 3,235,784 of Feb. 15, 1966, all assigned to the assignee of the present invention.

As will be seen from the above-identified patents, a variety of A.C. and D.C. needs for power may be expected to exist in any given process control installation. Where possible these needs are preferably supplied, ultimately, by the usual 117 volt or 234 volt A.C. mains. By means of such entities as transformers, rectifiers, inverters, regulators, oscilators and so forth, provision is made for particular A.C. and/or D.C. needs of the installation.

In the present case, the general concern is with providing D.C. power for installations having instrumentation normally energized by D.C. obtained by rectification of mains A.C. or equivalent, and in particular, with providing emergency D.C. power for solid state instrumentation using transistors, semi-conductor diodes, and the like.

Such power supply systems are known, and frequently include emergency D.C. power sources, usually storage bateries or cells which, if mains power fails, supplies the needed power (D.C. and/or A.C.).

An electrical power supply system according to the present invention is typified by various features, such as a nickel-cadmium cell arrangement emergency power source; regulation of the current through the load represented by the instrumentation powered by the system; provisions for ascertaining the condition of the nickel-cadmium cells collectively and, in effect, individually; provisions for preventing circulating currents in said cell arrangement; and indication or warning of system conditions such as under-voltage, over-voltage, over-discharge, emergency power use, and cell state of charge. The patentable subject matter involved in these features is particularly pointed out in the claims appended hereto.

In the drawing, a transformer 1 having secondary windings 2 and 3 also has a primary winding (not shown) connected to the 117/234 volt A.C. or equivalent mains energized by the generators of a utility company, or of the plant wherein the process control system is located. Preferably, the transformer is of the constant-voltage type as this eases the regulation requirements to be satisfied by the voltage regulator later to be described. While it is convenient to provide the transformer as shown, one or both of windings 2 and 3 could just as well be provided by separate transformers.

Winding 2 forms part of a conventional full-wave, capacitive input filter rectifier, generally denoted by the reference numeral 4, the negative terminal of the rectifier 4 being the center-tap 5 of winding 2. Rectifier 4 is terminated by a bleeder resistor 6, a common safety precaution. Rectifier 4 is but one of several known types of rectifiers that could be used, and since its structure as shown is well known, no further verbal description thereof is necessary. By way of example, transformer and the illustrated components of rectifier 4 are so chosen that the voltage across the resistor 6 is 37 volts D.C., plus or minus 10% over a range of total current drain of from zero to twenty-two amperes. The 37 or so volts of rectifier 4 is applied across a voltage regulator, generally indicated by the reference numeral 7 via a normally closed switch 8, which shorts out a resistor 9.

Regulator 7 may be of any suitable construction providing parallel current paths therethrough for the load current, and is preferably a solid state circuit. As many such circuits are known, the regulator 7 is functionally represented as transistors 10 controlled by suitable circuitry 11 that compares the voltage at the output of the regulator to that of a voltage reference 12, and controls the conductances of transistors 10 accordingly, symbolized by the lines connecting box 11 (via box 14) with the bases of transistors 10. Transistors 10 are in parallel with each other and with a normally open switch 13.

Box 14 represents current-limiting circuitry, permitting the power supply to be paralleled with another power supply and, as well, protecting the power supply from harm in the case that the supply is short circuited. Functionally speaking, the current-limiting circuitry decreases the regulated voltage in order to keep the power drain from the power supply circuit within allowable limits, and does this in response to an increase in load current to a predetermined value.

To continue the numerical example, the regulator 7 and current limiter 14 are constructed and arranged such that the regulated voltage appearing at the output of regulator 7 (in effect the voltage at a load terminal 15) is 24.5 volts plus or minus 2% and such that current-limiting occurs at 22 amperes.

Across the regulated voltage are connected an under-voltage detector 16 and an over-voltage detector 17. As shown, under-voltage detector 16 is a differential amplifier 18 which compares the regulated voltage with a reference 19 and produces a signal energizing a relay coil 20, and/or a warning device 21, and only when the regulated voltage is less than the reference voltage (that is, when the potential at terminal 15 is less negative than the potential of the negative side of reference 19). It is to be noted that the present supply is of the negative type, and the positive side of the supply represents ground or common reference potential. The principles involved here, however, could be applied to a positive type supply, or to a positive and negative supply, since essentially the same circuitry can be used in each case.

Over-voltage detector 17 is quite similar to under-voltage detector 16, like it having a differential amplifier 22, a reference 23, relay coil 24, and warning device 25. However, detector 17 produces an output if and only if the potential at terminal 15 is more negative than the potential of the minus side of the reference, this output energizing coil 24 and the warning device 25.

The regulator 7 permits a variation of plus minus 2% of 24.5 volts D.C. Accordingly, the reference 19 is set at 23.0 volts D.C., and the reference 23 is set at 28.0 volts D.C. How much leeway is provided by references 19 and 23 is determined from various considerations. Basically, the regulation desired is set by how much supply voltage variation the control system can tolerate without operation of some part thereof responding to the variation. For example, the illustrated power supply is designed for use with instruments tolerant of as much as 2% change in supply voltage without affecting the process by more than about 0.4% of the process control point (a measure of process state or condition, such as some value of temperature that the control valve is supposed to maintain in the process environment).

A shunt regulator 26 is provided to provide protection against increase in load current due to increase in regulated voltage. Thus, should be regulator 7, for any reason, allow the voltage at terminal 5 to get through to terminal 15, load current will increase, perhaps harming the load, and certainly having an effect on the process beyond the 0.4% supply voltage variation effect contemplated. Regulator 26 prevents harm to the load and reduces the latter effect by shunting current around the load, power resistors 27 and 44 being provided to dissipate the shunted current. If loss of voltage regulation by regulator 7 is involved, the action of the regulator 26 partially restores voltage regulation, since now the power supply is a typical partly regulated rectifier power supply whose output voltage is in direct proportion to load resistance. That is, the regulator shunts the load resistance, thereby increasing current drain and reducing output voltage. The constant voltage transformer, in turn, tends to counteract this effect, but as its regulating property is several times less effective than 2% regulation due to the regulator 7 (when this is operative), the effect due to load resistance decrease predominates. (Line voltage regulation is still 1% per 10% change of line voltage, however.)

Looking at the system as described thus far, it will be observed that on the negative side of the power supply the only element between the load resistance and the rectified voltage is the regulator 7. Accordingly, the most likely failure is in the regulator. Further, the most likely type of failure is that one of the regulator transistors becomes a short circuit. In such case, while series regulation would be lost, regulator 26 would then act as described heretofore, to restore a useful degree of regulation, until such time as the failure is corrected.

A much less likely type of failure is that a transistor 10 would open, that is, begin to pass no current at all. The remaining transistors 10 would then have to share the current that otherwise would have gone through the open transistor, and increase likelihood of failure of one of the remaining transistors. However, the *second* failure practically always would be a short in a remaining transistor, and were it not, a third failure would most surely be a short, for the probability of three open failures is fantastically minute.

As a practical matter, therefore, series regulator failure, whether by open or shorted transistor or transistors, will be compensated for by the shunt regulator 26, until such time as the cause of the failures can be corrected.

The over-voltage detector 17 responds to over-voltage by energizing relay coil 24 and warning device 25. Preferably, the warning device 25 remains energized, i.e., locks in, even if the voltage for some reason returns to normal, thereby preventing malfunction from being overlooked. Further, the switch 13 is also preferably closed and locked in by this relay, since, in practically all cases, regulator failure will be a shorted transistor 10. As in general, the failed transistor will have some circuit element connected thereto through which load current passes (such as one of emitter resistors 28), it is desirable to shunt current away from this element so as not to damage it by the increased current flow therethrough due to the transistor shorting.

Warning device 25 will stay on, and switch 13 will stay closed, therefore, until a human operative notes the warning and takes whatever action may be specified in such cases. Warning device 25 may be a horn, flashing light, etc., and may be but one of several such devices activated by the amplifier 22, and/or, indeed, by the relay corresponding to coil 24. Once the trouble resulting in the warning is rectified, the various contacts involved can be reset to open condition.

It is to be observed that, since the limiter 14 and, to some extent, the regulator 26, when operative, decrease the voltage at terminal 15, the warning would cease if such decrease were large enough, and the warning was not locked in. Accordingly, a shorted conductance path through the regulator would result in lesser regulation. Hence, it is important to assure that over-voltage is noted by continuing the warning of device 25, even if the over-voltage disappears, say, due to the action of regulator 26.

Since the warning evoked by over-voltage will not necessarily be noted immediately by appropriate personnel, preferably energizing relay coil 24 causes switch 8 to open, whereby load current flows through resistance 9, resistance 9 being chosen so as to drop enough voltage to help regulator 26 maintain the proper voltage.

Of course, switch 8 opens on over-voltage whether it was caused by a shorted transistor or otherwise, but as heretofore pointed out, a shorted transistor is the most likely failure to cause over-voltage.

The foregoing arrangement assures as nearly complete reliability as is practical, protection of the circuitry in case of failure, and warning of failing as long as the A.C. mains are providing the necessary power.

In case of loss or inadequacy of mains power, a D.C. source, indicated generally at B provides the power needed for the circuitry heretofore described as operated by the power drawn from rectifier 5. D.C. source B is chosen so that it can provide for a suitable time, the needed power. It will not ordinarily be practical or necessary to provide for indefinite operation on the power of source B, so source B will typically be a battery or a collection of batteries capable of providing the necessary current at a voltage less than the nominal value of the rectified voltage at the negative end of resistor 6, i.e., terminal 5, but great enough to operate the regulator 7, and the other circuitry on the output of regulator 7 for a sufficient length of time to allow for taking such measures as are normally taken on failure of A.C. power. Most commonly, such measures are alternates: repair or shutting down the process. In practice, repair of the sort requiring more than a few minutes, is likely to require more time than a practical source B can last. A good choice is fifteen minutes, as this allows enough time for ascertaining the cause of A.C. power failure, repairing the usual short-term type failure, and shutting down the process should repair not succeed, or should the failure be of the long-term type.

Source B is provided with various facilities for assuring unceasing readiness to provide D.C. power in emergency, one such facility including a rectifier 29, energized by winding 3, for charging purposes.

Source B is shown as batteries connected in three parallel cell strings 30. In the specific example, each string is preferably a so-called package of nickel-cadmium storage batteries (such as Everready1007), each battery consisting of a number of individual cells and each package being nominally capable of providing 44 ampere hours of discharge, when discharged to a voltage of 7.2 volts. In the present system, this provides a source voltage not less than 27.5 volts while discharging at the rate of 20 amperes for fifteen minutes.

The negative terminal 31 of the source B connects directly to the negative end of resistor 6, that is, in effect, to terminal 5. The positive terminals 32 of the strings 30 connect directly, in effect, to the power supply positive terminal 33, but actually through a set of diodes 34. In the same fashion, the positive end of resistance 6 is connected directly, in effect, to terminal 33, but actually through a diode 35 (and, along with terminals 32, through a diode 36 and normally closed switch 37 shunting diode 36).

Considering the polarity of the output voltage of rectifier 4 and of source B, and the illustrated polarities of diodes 34 and 35, said diodes form a sort of "highest of" selector, that is, that diode (or set of diodes, as the case may be) is biased to conduction which is connected at its cathode (or cathodes) to the highest positive voltage. Accordingly, though both source B and rectifier 4 are connected to regulator 7, in normal circumstances the load current is drawn from rectifier 4 because the rectifier voltage is higher than the source voltage, and biases the set of diodes 34 into non-conduction. However, when the voltage of rectifier 4 drops below the voltage of source B, then diode 35 is biased into non-conduction, and diodes 34 conduct instead, so that load current is now drawn from source B. The switch between source B and rectifier 4 is smooth, because for a short time interval, including the instant when source voltage is equal to rectifier voltage, both rectifier and source are providing load current, the one increasingly and the other decreasingly, so that during the switchover, adequate load current flows at all times.

Lead-acid cells could be used for source B. However, in comparison to lead-acid cells, nickel-cadmium cells require less maintenance, take up less space, do not gas as readily, can be more easily sealed and still provide for venting gas and more nearly maintain their nominal voltages throughout discharge.

Each of the three strings of cells has the same nominal voltage but in actual practice these voltages will differ. In conventional practice, paralleling strings of nickel-cadmium cells is avoided because of the constant voltage characteristic and low internal impedance of nickel-cadmium cells. Thus, two (or more) supposedly identical, parallel-connected strings of cells form a charging circuit in which the higher voltage string charges the lower voltage string. With lead-acid cells, this is tolerable because internal impedance is relatively high. With nickel-cadmium cells, the higher voltage string will, likewise, charge the lower voltage string. However, the latter may be already fully charged and, hence, will be getting overcharged. According to the present invention, diodes 34 prevent such charging. In the connection shown, diodes 34 offer their negligible forward resistance to battery current flow through a load across the source B, the diodes also prevent appreciable current flow through the batteries in shunt when such load is disconnected, because the latter flow is against diode back-resistance, which is extremely large.

The purpose of transformer winding 3 is to provide for keeping the source B fully charged. Accordingly, rectifier circuit 29 has its positive terminal 38 connected via sets of resistors 40 and diodes 41 to the cell strings as shown. Normally, a switch 42 is open, causing charging current flow to be through resistors 39 and 40 in series. When switch 42 is closed, the diodes 41 are shunted across the resistors 39, effectively replacing the resistance of resistors 39 with the small forward resistances of the diodes.

As the negative terminal 43 of the rectifier circuit 29 is connected to the negative terminal 31 of source B, source B will be getting charged at all times when the winding 3 is energized. However, such charging is at a rate determined by the condition of switch 42, resistors 39 and 40 being so chosen such that when each cell string is in series with one each of resistors 39 and 40, the charging is at a low or "trickle" rate just sufficient to keep the cell charge at about peak if standing-by under no load for perhaps months, and such that when switch 42 is closed, charging rate will increase to a value suitable for quickly, yet safely recharging the sells after substantial discharge thereof. With nickel-cadmium cells, it is customary to periodically discharge them and recharge them, typically, every six months, as part of routine maintenance, and, of course, after the source B has been called on for emergency power, recharging is necessary. In both cases, a suitable "trickle" rate is too low to recharge the batteries in a reasonable time, being sufficiently low that the cells can be subjected indefinitely to the trickle current without becoming overcharged.

Diodes 41, it will be noted, allow the junctions of resistors 39 and 40 to have a common terminal for switching purposes, so that the single switch 42 (which is equivalent to a single throw, single pole switch) suffices to shunt and unshunt resistors 39, i.e., the back resistances of the diodes prevents appreciable current from circulating through these resistors in shunt to the current path through the rectifier and transformer winding.

Discharge of source B, for maintenance purposes, is provided for by resistors 44, switch 45 and switch 46, both switches being closed when the source B is discharged. Resistors 44 are therefore chosen to have such power dissipating capacity and overall resistance as to provide a load via which the source B can be safely discharged. Switch 46 further provides for discharge of the source B one string at a time. When switch 46 is open, and switch 45 is closed, only the one resistor 44 is across the power source. The use of this feature is to provide for determining the condition of a single string of cells in source B, by disconnecting two of the strings and permitting the other string to discharge through the single resistor 44 left in circuit when switch 46 is open and switch 45 is closed. We have observed that one or more cells of a string may be defective without the defect showing up as undervoltage except when the string is discharging. That is, simply measuring the open circuit voltage of a single string may not disclose anything but an apparently normal voltage. However, if the string is allowed to discharge, as it would in normal use, such defect (cell polarity reversal, or the like) will show up as a premature undervoltage at some point during the discharge of the string. Normally, such defect would be sought for when the source B is being discharged, as mentioned above, during the course of routine maintenance. However, as the strings are in parallel, the effect of bad cells is substantially swamped out by the parallel arrangement. Thus, the voltage of source B may be monitored throughout discharge, but if a cell in a string at some point begins to have an undervoltage, the monitored voltage will be kept up by the other strings. Moreover as the voltage contribution of a single cell is small compared to the total source voltage contemplated (e.g., 28 to 33 volts) several cells could have undervoltages without the monitored voltage being affected in what would be judged a significant amount. However, by discharging one string at a time, a cell defect showing up in dynamic conditions is readily apparent as a sharp, if small, drop in voltage. It is to be noted that commercial forms of nickel-cadmium cell assemblies are packaged so that it is not only impractical to try to get at single cells for testing purposes, and that a single cell testing approach is impractical in the first place: dynamically testing each cell individually would be excessively time-consuming and static tests would not disclose dynamic failures.

The single-string approach however, is eminently practical, for the remarkable constancy of the nickel-cadmium string over the permissible extent of discharge is such that as a rule, a drop of string voltage of approximately a volt signifies cell going or gone bad during discharge. The single significant exception to the rule is that when the charge of the string is about exhausted, its voltage begins to drop off. However, the drop at near-exhaustion increases at a characteristic and unceasing rate that cannot be confused with the drop due to a cell going bad.

The source B may or may not be discharged completely during a given instance of use thereof to provide emergency power and, moreover, for maintenance or replacement purposes, its condition may be judged by how often it has been discharged and how many hours it has discharged during its existence. While factors such as these may be noted in records, preferably the elapsed time indicator 47 is provided to provide an automatic record of the condition of the source B, (in particular, the state of charge, which is not otherwise conveniently, easily, and reliably determinable. Indicator 47 is simply an amplifier 48 controlling a motor 49 that operates a revolution counter 50 or equivalent accumulating device. Normally open switch 51 controls application of the source voltage to the amplifier 48. When switch 51 is closed, amplifier 48 starts motor 49 which then at a constant rate operates counter 50 which is constructed and arranged such that its indication gives the time motor 49 operates. Counter 50 retains its count unless manually reset, normally being reset to zero only when the need for battery charge is acknowledged.

Switch 51 preferably closes automatically in response to drawing power from source B whether for maintenance purposes or to provide emergency power. When switch 51 is open, amplifier 48, of course, stops motor 49.

While it is possible to get some idea of the intermediate charge condition of source B from the indicator 47 (since counter 50 is normally reset to zero when the batteries are at full charge, or are being charged to that condition), it is preferable to provide an overdischarge indicator 52. Overdischarge indicator 52 is basically similar to undervoltage indicator 16, in that it includes a differential amplifier 53 which senses the differences between the voltage of a reference voltage source 54 against the voltage at the common junction 55 of a set of diodes 56.

Diodes 56 form, in essence, a "lowest of" selector, in that the voltage at terminal 55 is the least of the voltages applied to their cathodes. The cathode voltages of diodes 56 are obtained from level setting networks consisting of resistance set 57, resistance set 58 and resistance set 59. Resistance set 59, as shown, has its resistances connected to the negative terminals 32 of strings 30, each resistance in set 59 being connected in series with a resistance of set 58, which in turn is connected in series to a resistance of set 57. Each resistance of set 59, finally, is connected to the junction of a resistance of set 40 and the cathode of one of the diodes of diode set 34.

The resistors of set 58 are what are often called potentiometers, each having a tap or slider 60 that may be positioned along the resistance so that a voltage may be picked off the tap, which voltage is intermediate the voltages at either end of the resistance. Each tap 60 is connected to the cathode of a diode of diode set 56. Taps 60 are set so that when any battery string drops to 26.4 volts or less, the voltage at terminal 55 will cause the amplifier 53 to sense a reversal in polarity (relative to reference voltage source 54), and actuate a relay coil 61, and/or a light, horn or other warning device 62 to call attention to the overdischarge.

With the example of battery specified, 26.4 volts is the lowest voltage to which a string should be discharged. Actually, some useful discharge remains at this point, but at the risk of damage to the cells. Moreover, at this point the string voltage is beginning to drop steeply. Preferably, the warning persists, e.g., the relay operates the warning device and locks in irrespective of what next happens to source B, since it is then important to put the source on fast charge. Ordinarily, all strings are low in charge by the time the voltage of one drops enough to actuate the overdischarge indicator. Moreover, the series resistance across the cell strings, due to resistor sets 57, 58 and 59, is chosen to be large enough that no significant amout of current is drawn thereby.

The system also includes an emergency power indicator 63. Like elapsed time indicator 47, which operates whenever source B is discharging, emergency power indicator 63 may energize a relay coil and/or operate a light, buzzer or other warning device whenever power is being drawn from source B. However, it is mainly needful to do so only when source B is providing emergency power.

Indicator 63 includes a differential amplifier 64 connected to the common junction of the cathodes of diode set 65 and to the cathode of diode 66, whose anode is connected to the anode of diode 35. Amplifier 64 is constructed and arranged to energize a warning device 67 and/or a relay coil 68, whenever (and only then) the voltage at the anode of diode 35 is more negative than that at the junction of diodes 65. This condition occurs when the voltage of the source B is larger than the voltage the rectifier 4 can create across resistor 6. Since this latter condition occurs only when source B is providing emergency power for the load, the device 67 warns whenever emergency power is being drawn.

For "fast" charging purposes, the transformer 1 may have a winding 69 (which may actually be also the primary winding of transformer 1) for powering a timer 70, which may be of the well-known type wherein one sets a knob 71 or the like to some particular time, thereby starting a spring-powered or electric clock and, as well, closing switch 42 at the same time, either mechanically through a linkage, or by energizing, from winding 69, the coil 72 of a relay having a set of contacts providing the switch 42. When the clock has ticked off the set time, it automatically deenergizes coil 72, thereby opening switch 42, thus restoring the trickle charge rate. A suitable warning device 73 may also be operated with or by coil 72. Other modes of rechanrging source B can obviously be adopted instead.

The essential operation of the power supply system will be evident from the foregoing. Thus, when rectifier 4 is providing the power used in load L, switch 8 is closed, switch 13 is open, switch 45 is open, switch 42 is open and switch 46 is closed (as is a switch 75 which connects shunt regulator 26 to the network of power resistors 44 and 27).

If A.C. power fails, then source B substitutes itself, so to speak, for rectifier 4. Indicator 63 operates to indicate this and, also, to close switch 51, as by energizing coil 68, which causes amplifier 48 to turn motor 49 on.

Eventually, the power failure is cured. By this time, source B is partly or completely discharged. One now may set timer 70, thereby closing switch 42, for a time sufficient to bring the batteries up to full charge, and simultaneously reset counter 50 to zero. If A.C. power fails at this time, source B takes over to provide whatever power is still stored therein. If the source B furnishes power long enough, the voltage of one or more of strings 31 will fall below the normally-recommended value, a condition that will be announced by indicator 52.

With nickel-cadmium cells, maintenance is typically a matter of discharging and recharging them every six months, and replacing them, either after a given number of charge and discharge cycles, or after testing shows replacement is necessary. Thus, switch 75 is opened and switch 45 is closed, and, source B is allowed to discharge through the resistors 24 and 27, until the indicator 52 announces that at least one string 30 has dropped to fully discharged state.

Alternately, switch 46 is opened and two of strings 30 are disconnected from terminal 31, and then switch 75 is opened and switch 45 is closed. Now the remaining string 30 only is allowed to discharge until indicator 52 announces that its voltage has reached the lowest permissible value. One after another, strings 30 are thus discharged. Since the strings normally will all be charged to the same extent, a defective string will show itself by the fact that indicator 52 will announce reaching the lowest permissible voltage in less time than it takes a normal string in good condition. Ordinarily, this test will be carried out beginning with presumably fully charged strings, and it will be known how long it should take a fully charged string in good condition to discharge fully.

If the indicator 52 announces that lowest permissible voltage is reached in a cell string sooner than expected, this indicates a cell reversal, cell short, or other voltage-dropping fault. As noted before, such fault may not occur except during discharge, or at a state of charge between fully charged and discharged states. Moreover, during simultaneous discharge of the strings, indicator 52 would signal any such fault, but would not tell which string it occurred in.

The entities referred to supra, as differential amplifiers, are well-known devices which need not be described in any detail. As is evident from the preceding description, these amplifiers are specified for their property of comparing like polarity sources and producing an output that changes level or sense in response to change in sense of difference between source voltages, and is applied to a relay or equivalent which variously opens and closes one or more sets of contacts or switches, depending on the change, or performs equivalent switching functions. For instance, the change hereinabove contemplated is from zero output to a non-zero level capable of energizing a coil of a relay wherein the magnetic field of the coil forces an armature to open or close one or more sets of contacts, or to close some and open others, and so on.

Generally speaking, the electrical power needed by the power supply circuits ultimately stems from the transformer 1 or from the source B. Thus, the several voltage references may be Zener diodes (reference 54, for example, is illustrated as such), energized by whichever power source is in use. However, while it is necessary that the source B energize the circuitry regulating and monitoring the load current and voltage, and so on, when the load is using the emergency power of source B, the latter preferably floats on its charging circuitry at all other times (except when being discharged for maintenance purposes, of course). A switch 76 may be provided, if desired, for disconnecting the negative side of source B from the system.

The current and voltage requirements of the power supply and the need for extreme reliability more or less dictate that the circuitry be entirely solid state, preferably transistor and semiconductor diodes. Obviously, switching functions assigned herein to relays with moving parts can be accomplished by so-called solid state devices such as transistor switches, saturable reactor devices and the like. While certain features of the invention, such as the circuitry involved in detecting bad cells, in preventing circulating currents in the arrangement of battery strings, in charging, and in overdischarge indication are peculiar to or especially advantageous for nickel-cadmium battery systems, lead-acid batteries may be substituted directly for the nickel-cadmium batteries. Such substitution does not obviate the overdischarge indicator for the reason that, while state of charge of lead-acid batteries can be determined from static voltage measurements, total time under discharge is still a better index of battery condition and also provides a convenient measure of battery charge.

The switching scheme described herein is a simplified one devised for purposes of description. It nevertheless provides the essential switching required for the intended use of the power supply, and it is left to one skilled in the art to elaborate upon spatial arrangement, type of relays and switches, and like considerations dictated by manufacturing convenience and need for commercial appeal.

The use of the diode 36 is to permit paralleling several power supply systems across one load, to obtain greater reliability and/or power, for example, then one system may be able to provide. For this purpose, the switch 37 of which each system would be opened. In this connection, it will be observed that the positive sides of reguators 7 and 26, undervoltage and overvoltage detectors 16 and 17, power source B, and rectifier 4, connect, as indicated by the circuit common symbol 74, not directly to positive terminal 33, but rather through the forward resistance of diode 36. The advantage of this is that the diode isolates the systems, e.g., the regulators of one system are thereby prevented from attempting to regulate in the other or other systems, and so on.

The box L connected between terminals 15 and 33 represents the combined DC resistance of the instrumentation load on the power supply system.

In the above description, each relay coil is disclosed as associated with a warning device, and some as operating certain of the disclosed switches. It is also indicated that the warning devices could be operated by the relay coil or, as well along with them, but not by them. The choice of features such as these is within the skill of the art, generally speaking, and basic operation of the power supply is not dependent on their being warning devices or on opeartion of the various switches by relay coils, or at all automatically.

Having described our invention in accordance with the statutes, we claim:

1. A process control installation, incuding in combination, electrically-powered instrumentation constructed and arranged for use in process control and effectively constituting a load resistance;
   a first source of electrical power connected to said load resistance for applying electrical power to same;
   a second source of electrical power adapted to be connected to said load resistance for applying electrical power to same, if said first source of electrical power fails;
   a voltage regulator connected in series between said first source of electrical power and said load resistance for regulating the voltage across said load resistance to apply such electrical power at said regulated voltage to said load resistance; and over-voltage responsive means independent of said voltage regulator and responsive to the voltage across said load resistance to limit the last said voltage to at least approximately the value to which said voltage regulator is designed to regulate the source voltage applied thereto.

2. The invention of claim 1, further including, in combination, an over-voltage detector for producing a signal if the voltage across said load resistance attains a value greater than the value to which said voltage regulator is designed to regulate the source voltage applied thereto.

3. The invention of claim 1, wherein said voltage regulator is connected in series between said second source of electrical power and said load resistance; there being means responsive to the voltages of said sources for effectively disconnecting said second source, from said voltage regulator, when said second source is lower in voltage than said first source.

4. A process control installation, incuding in combination, electrically-powered instrumentation constructed and arranged for use in process control and effectively constituting a load resistance;
   a first source of electrical power connected to said load resistance for applying electrical power to same, when connected thereto;
   a second source of electrical power adapted to be connected to said load resistance for applying electrical power to same, if said first source of electrical power fails;
   time indicating means connected to said second source for registering time elapsed duing such periods as power is drawn from said second source, and for indicating accumulatively the total time elapsed in said periods.

5. A process control intallation, including in combination, electrically-powered instrumentation constructed and arranged for use in process control and effectively constituting a load resistance;
   a first source of electrical power connected to said load resistance for applying electrical power to same, when connected thereto;

a second source of electrical power adapted to be connected to said load resistance for applying electrical power to same, if said first source of electrical power fails;

indicating means for indicating the state of change of said second source;

a charging circuit and a timer, said timer including control means for connecting said charging circuit and said storage devices in charging relationship; said timer having setting means for setting the length of time said control means is so operative.

6. The invention of claim 5, wherein said indicating means registers time elapsed during such periods as power is drawn from said second source, and indicates accumulatively the total time elapsed in said periods.

7. A highly reliable power supply system including, in combination, a first source of D.C. power constructed and arranged to normally supply power to a load;

a second source of D.C. power constructed and arranged to supply said power upon failure of said first source;

a voltage regulator constructed and arranged to regulate, to a given value, the voltage at which said power is supplied to said load;

over-voltage prevention means constructed and arranged to prevent the voltage across said load from exceeding a value corresponding to said given value, and being independent of said voltage regulator;

voltage detecting means constructed and arranged to indicate deviation of regulated voltage from said given value;

indicating means constructed and arranged to register time elapsed during such periods as said second source is supplying power to said load, and to indicate accumulatively the total time elapsed in said periods;

said second source being an arrangement of storage cells of the type having substantially constant voltage throughout their useful life;

charging means constructed and arranged to charge said second source continuously at a trickle rate;

said charging means also being operable to charge said second source at a fast rate;

timer means constructed and arranged to operate said charging means such that the latter charges said source at a fast rate, said timer means being settable to so operate said charging means for a desired predetermined time;

over-discharge indicating means constructed and arranged to indicate decrease of the voltage of said second source from a substantially constant value that is a function of the said arrangement of storage cells.

8. The invention of claim 7, wherein said arrangement is a plurality of like strings of said storage cells, said strings being in parallel with one another so as to provide said second source with, in effect, a common positive terminal and a common negative terminal;

there being a resistance network independent of said load and proportioned to provide a load suitable for discharging said second source therethrough for maintenance purposes;

said strings being disconnectable jointly and severally from one of said terminals, and a part of said network being disconnectable from the remainder thereof and connectable to said terminals for discharge therethrough of one of said strings, said part being proportioned to provide a load suitable for discharging one of said strings therethrough for maintenance purposes.

References Cited

UNITED STATES PATENTS

| 1,931,687 | 10/1933 | Holden et al. | 307—66 |
| 3,040,182 | 6/1962 | Lapuyade | 307—66 |
| 3,189,788 | 6/1965 | Cady | 307—66 X |
| 3,271,652 | 9/1966 | Walz et al. | 320—44 |

ROBERT K. SCHAEFER, Primary Examiner

H. HOHAUSER, Assistant Examiner

U.S. Cl. X.R.

320—48